T. GANDERTON.
TOOL FOR PREPARING WORK TO RECEIVE A LOCK WASHER.
APPLICATION FILED JUNE 7, 1912.

1,091,925.

Patented Mar. 31, 1914.

Witnesses
P. Bredel
B. Fuller

Inventor
Thomas Ganderton
by Wm. M. Honor
Attorney

UNITED STATES PATENT OFFICE.

THOMAS GANDERTON, OF CLEVELAND, OHIO, ASSIGNOR OF ONE-HALF TO CONRAD MUELLER, OF CLEVELAND, OHIO.

TOOL FOR PREPARING WORK TO RECEIVE A LOCK-WASHER.

1,091,925.   Specification of Letters Patent.   Patented Mar. 31, 1914.

Application filed June 7, 1912. Serial No. 702,229.

*To all whom it may concern:*

Be it known that I, THOMAS GANDERTON, a citizen of the United States, and resident of Cleveland, in the county of Cuyahoga and State of Ohio, have invented certain new and useful Improvements in Tools for Preparing Work to Receive a Lock-Washer, of which I hereby declare the following to be a full, clear, and exact description, such as will enable others skilled in the art to which it appertains to make and use the same.

The invention comprises a tool employed in connection with a nut locking washer for a bolt or stud and nut thereon, the washer being provided with engaging means for the nut and also with projecting points adapted to engage with corresponding recesses in the face of one of the parts of the work which the bolts connect together.

The objects of the use of the tool are to provide means for making these depressions in the surface of the work into which the projections on the washer must accurately fit.

The invention also comprises means for centering the tool to insure the accurate registering of the said projections and recesses when the washer and nut are tightened upon the bolt, and further consists in the combination and arrangement of parts and construction of details hereinafter described, shown in the accompanying drawings and specifically pointed out in the claim.

Figure 1:
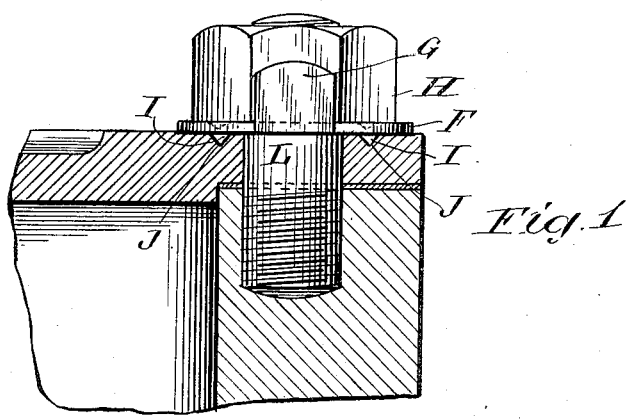
Figure 2:
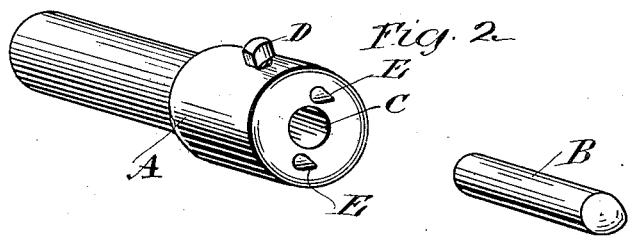
Figure 3:
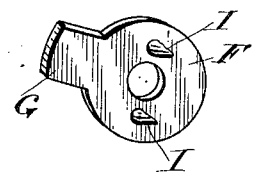
Figure 5:
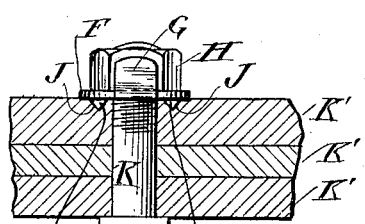
Figure 4:
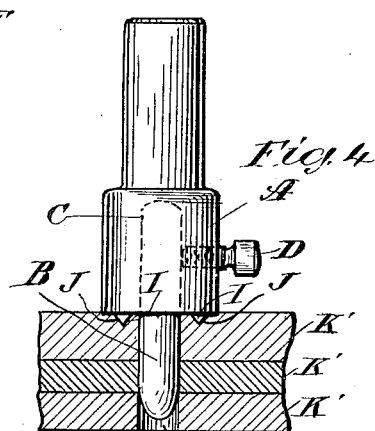

In the accompanying drawings Figure 1 is a vertical section showing a threshing cylinder wall and part of a cylinder head, and a stud secured by means of a nut and lock washer. Fig. 2 is a perspective view of the tool separated into two parts; Fig. 3 is a perspective view of the lock washer, Fig. 4 is a transverse section showing the use of the guiding and centering portion of the tool when preparing the work for the reception of the washer. Fig. 5 is a similar section showing plates bolted together, and a nut and lock washer thereon.

In these views A is the body of the tool B is a cylindrical projection detachably secured in an axial opening C in the tool by means of a set screw D, so that it can easily be inserted and removed to adapt the tool for use with different kinds of work.

Upon the outer face of the tool are shown pointed projections E, E which are spaced preferably upon a diametrical line at equal distances from the center.

In Fig. 3 the washer is shown where F is the body of the washer, G is an integral flap which is turned up against one of the faces of a nut H as shown in Figs. 1 and 5 and I, I are projections upon the underside of the nut spaced to correspond with the projections E, E upon the tool.

The tool is used to form depressions J, J in the face of the work, in which depressions the projections I, I on the washers fit accurately. In this manner the washer is prevented from turning when the nut is screwed down upon the work and the nut cannot turn because prevented from doing so by the turned up flap of the washer.

The tool is used in the manner shown in Fig. 4 to prepare the work to receive a lock washer F for a bolt P.

The projection D is inserted in a bolt hole such as K in the plates K' K' and is of the same size as the hole and thus forms a perfect guide and centering device for the tool so as to insure that the points I, I will register accurately therewith. Exactly the same spacing must be used for points and depressions.

When used with a stud as L, in Fig. 1 the projecting pin B can be removed and the tool can be centered by inserting the end of the stud into the opening in the center of the tool.

The tool is struck by a hammer to drive the points into the work, and is small and conveniently carried in the pocket.

Having described the invention what I claim as new and desire to secure by Letters Patent is:

The combination in a tool for the purpose described, of a cylinder having a flat lower face, oppositely placed integral short projecting points in said face, said cylinder having a central opening, and an elongated cylindrical blunt pointed pin detachably secured in said central opening, said blunt pointed pin adapted to enter a bolt hole and said integral points adapted to make depressions in the metal on opposite sides of said bolt hole.

In testimony whereof, I hereunto set my hand this 27" day of May, 1912.

THOMAS GANDERTON.

In presence of—
  WM. M. MONROE,
  P. BREDEL.

---

Copies of this patent may be obtained for five cents each, by addressing the "Commissioner of Patents, Washington, D. C."